(12) United States Patent
Bian et al.

(10) Patent No.: US 11,196,036 B2
(45) Date of Patent: Dec. 7, 2021

(54) HIGH ENERGY DENSITY FAST CHARGE LI ION BATTERY AND THE METHOD OF PREPARING THE SAME

(71) Applicant: Nano and Advanced Materials Institute Limited, Hong Kong (HK)

(72) Inventors: Juncao Bian, Hong Kong (HK); Shengbo Lu, Hong Kong (HK); Chenmin Liu, Hong Kong (HK); Wai Yin Wong, Hong Kong (HK); Hong Zhao, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 256 days.

(21) Appl. No.: 16/599,139

(22) Filed: Oct. 11, 2019

(65) Prior Publication Data

US 2020/0044236 A1 Feb. 6, 2020

Related U.S. Application Data

(63) Continuation-in-part of application No. 16/407,207, filed on May 9, 2019, now Pat. No. 10,971,945, and (Continued)

(51) Int. Cl.
  *H01M 4/133* (2010.01)
  *H01M 4/66* (2006.01)
  (Continued)

(52) U.S. Cl.
  CPC ........... *H01M 4/133* (2013.01); *H01M 4/663* (2013.01); *H01M 10/0525* (2013.01); *H01M 2010/4292* (2013.01)

(58) Field of Classification Search
  CPC .. H01M 4/133; H01M 4/663; H01M 10/0525; H01M 2010/4292;
  (Continued)

(56) References Cited

U.S. PATENT DOCUMENTS 6,632,569 B1 10/2003 Kameda et al.
6,783,747 B1 8/2004 Sudo et al.
(Continued)

FOREIGN PATENT DOCUMENTS

EP 0918040 B1 1/2003
EP 2418172 B1 9/2018

OTHER PUBLICATIONS

Albert V. Tamashausky. "An Introduction to Synthetic Graphite." Asbury Carbons, 2006, pp. 1-12.

*Primary Examiner* — Stewart A Fraser
(74) *Attorney, Agent, or Firm* — Idea Intellectual Limited; Margaret A. Burke; Sam T. Yip

(57) ABSTRACT

A fast charge lithium ion battery capable of being charged or discharged with 80% capacity retention at C rate of at least 2C is provided in the present invention, which includes a fast charge graphite-based anode; a cathode; and a separator, wherein the anode includes an anode current collector and a fast charge graphite layer deposited on at least one surface of the anode current collector, the fast charge graphite having a lattice constant equals to or larger than 0.3374 nm, a D-band to G-band integrated area ratio ($I_D/I_G$) of 0.03 to 0.3, and a surface morphology of a plate-like crystal structure under a scanned electron microscope; the cathode includes a cathode current collector and one or more active materials deposited on at least one surface of the cathode current collector.

13 Claims, 4 Drawing Sheets

Related U.S. Application Data a continuation-in-part of application No. 15/924,299, filed on Mar. 19, 2018, now Pat. No. 10,490,843, which is a continuation-in-part of application No. 15/924,299, filed on Mar. 19, 2018, now Pat. No. 10,490,843.

(60) Provisional application No. 62/788,149, filed on Jan. 4, 2019, provisional application No. 62/771,598, filed on Nov. 27, 2018, provisional application No. 62/673,141, filed on May 18, 2018, provisional application No. 62/602,010, filed on Apr. 10, 2017.

(51) Int. Cl.
*H01M 10/0525* (2010.01)
*H01M 10/42* (2006.01)

(58) Field of Classification Search
CPC ............ H01M 4/1393; H01M 4/0435; H01M 10/058; H01M 4/0404
See application file for complete search history.

(56) References Cited

U.S. PATENT DOCUMENTS

| | | | |
|---|---|---|---|
| 9,059,467 B2 | 6/2015 | Wakizaka et al. | |
| 9,490,499 B2 * | 11/2016 | Kawai | H01M 10/0525 |
| 10,283,775 B2 * | 5/2019 | Kawai | H01M 4/133 |
| 2002/0160266 A1 | 10/2002 | Yamazaki et al. | |
| 2009/0311599 A1 * | 12/2009 | Kawai | H01M 4/587 |
| | | | 429/217 |
| 2017/0084921 A1 * | 3/2017 | Kawai | H01M 4/133 |
| 2018/0375093 A1 * | 12/2018 | Mitra | H01M 10/0525 |

\* cited by examiner

HIGH ENERGY DENSITY FAST CHARGE LI ION BATTERY AND THE METHOD OF PREPARING THE SAME

CROSS-REFERENCE TO RELATED APPLICATIONS

This application claims priority from (1) U.S. Provisional Patent Application Ser. No. 62/771,598 filed Nov. 27, 2018, and is a continuation-in-part of (2) U.S. Non-Provisional patent application Ser. No. 15/924,299 filed Mar. 19, 2018, and (3) U.S. Non-Provisional patent application Ser. No. 16/407,207 filed May 9, 2019, and the disclosures of which are incorporated herein by reference in their entirety.

FIELD OF THE INVENTION

This invention generally pertains to the field of fast charge lithium ion battery.

BACKGROUND

The widespread electrification of vehicles and development of consumer electronics requires robust fast charge Li ion batteries that can be charged to 80% of state-of-charge (SOC) in minutes under all weather conditions. The lifetime of the batteries should also be long enough to reduce the total cost for long-term applications of EVs or consumer electronic devices. From the point views of safety and life, the lithium-ion batteries should not suffer any lithium dendrites grown on the surface of anodes during fast-charging and low temperature charging.

Conventional batteries applied in consumer electronics, such as smart phones and laptops, are always charged slowly at C rate less than 1C, where 1C means a charge or discharge rate equal to the capacity of the battery in one hour. It is possible that these batteries can be fast charged with a rate higher than 1C. However, these batteries may not retain large ratio of the capacity under fast charge. Moreover, the lifespan of the batteries will be largely reduced after the fast charge/discharge cycles.

SUMMARY OF THE INVENTION

Therefore, a fast charge lithium ion battery is provided in the present invention comprising a fast charge graphite-based anode, a cathode and a separator, wherein the anode includes an anode current collector and a fast charge graphite layer deposited on at least one surface of the anode current collector, the fast charge graphite having a lattice constant equals to or larger than 0.3374 nm; the cathode includes a cathode current collector and one or more active materials deposited on at least one surface of the cathode current collector.

Under scanning electron microscope, the fast charge graphite according to an embodiment of the present invention has a surface morphology of a plate-like crystal structure (or flake shape).

In one embodiment, the fast charge graphite has an X-ray diffraction peak at 26.35° two theta.

In another embodiment, the fast charge graphite has Raman spectrum integrated area ratio ($I_D/I_G$) in the range of 0.03~0.3, wherein a peak intensity of the G-band integrated area is in a range of 1300~1400 cm$^{-1}$ and a peak intensity of the D-band integrated area is in a range of 1530~1650 cm$^{-1}$ as measured by Raman spectroscopy at a laser wavelength of 633 nm.

In yet another embodiment, the Raman spectrum D band to G band ratio of the fast charge graphite is about 0.054.

In other embodiment, the fast charge graphite has a particle size of 5~30 μm, in which more than 60% of the fast charge graphite are less than 20 μm.

In yet another embodiment, the one or more active materials deposited on the cathode current collector comprise LiFePO$_4$, LiMnO$_2$, LiCoO$_2$, LiNi$_x$Mn$_y$O$_2$ and LiNi$_{0.1x}$Co$_{0.1y}$Mn$_{0.1z}$O$_2$, where x=1~10; y=1~10; z=1~10.

In other embodiment, the separator comprises PP and PE layers either with or without ceramic materials coated on at least one surface of the separator.

In other embodiment, the separator has a thickness of 5~40 μm.

There is also provided a graphite slurry formulation for forming the fast charge graphite-based anode comprising the fast charge graphite of the present invention, super P, carboxymethyl cellulose (CMC) and styrene-butadiene rubber (SBR).

In one embodiment, the fast charge graphite, super P, CMC and SBR have weight ratios of 70%~93%, 3%~10%, 3%~10% and 1%~10%, respectively.

To prepare the slurry formulation, at least 3% CMC powders are added into deionized water followed by thorough mixing for a first period of time until a first mixture is formed. After that, super P powders are added into the first mixture and then mixed well for a second period of time until a second mixture is formed. The present fast charge graphite powders are then added into the second mixture and mixed well for a third period of time until a third mixture is formed. After that, a solution containing SBR is added into the third mixture and mixed well for a fourth period of time until a fourth mixture is formed. Additional deionized water is then added into the fourth mixture until the viscosity of the mixture is tuned into a range of 3,800~8,000 cps.

The fast charge graphite layer of the present battery is formed by coating the graphite slurry formulation on at least one surface of the anode current collector via compression at a compression ratio of 0.6~0.8.

In one embodiment, said coating is carried out by slot die or blade or offset cylinder printing.

After the coating of the slurry formulation on at least one surface of the anode current collector is dried, the anode is compressed at the specified compression ratio.

In a preferred embodiment, said compression is carried out by calendering at room temperature.

To retain at least 80% of capacity at higher C rate after certain number of cycles of charged/discharged, a more specific compression ratio of 0.65~0.7 is used during calendering of the anode.

The anode formed after said compression has an areal capacity of 0~3.5 mAh/cm$^2$. More specifically, the areal capacity of the anode is 1.5~2.8 mAh/cm$^2$ for fast charge application with longer cycling performance under higher C rate, for example, at least 2C.

The anode formed after said compression has an areal density (or mass loading) of 5~10 mg/cm$^2$.

The present battery is capable of being charged and discharged with 80% capacity retention at C rate of at least 2C.

More specifically, the present battery is capable of being charged and discharged with 80% capacity retention at C rate of 2C, 3C, 4C and 6C for 834, 230, 212, and 64 cycles, respectively.

BRIEF DESCRIPTION OF THE DRAWINGS

Embodiments of the invention are described in more detail hereinafter with reference to the drawings, in which.

DETAILED DESCRIPTION

Figure 1A:
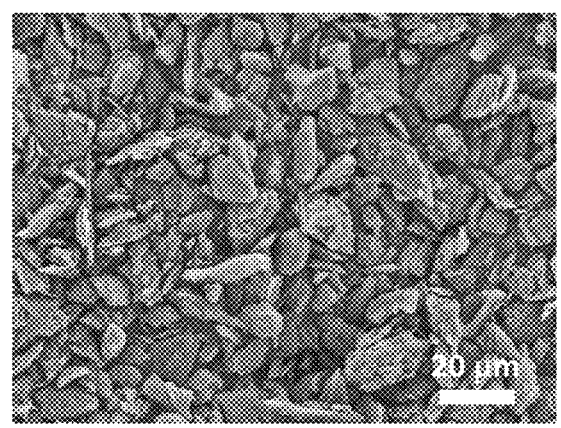
FIG. 1A shows a scanning electron microscopy (SEM) image of the fast charge graphite according to an embodiment of the present invention.

FIG. 1A shows that the fast charge graphite has a plate like structure.

Figure 1B:
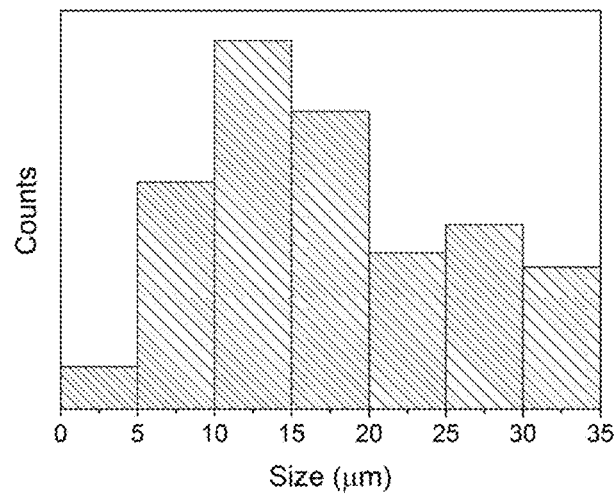
FIG. 1B is a size distribution diagram of the fast charge graphite according to an embodiment of the present invention.

FIG. 1B shows a size distribution diagram of the fast charge graphite of the present invention. The particle size is in a range of 5-30 μm. 60% of the graphite microparticles have the size less than 20 μm.

Figure 1C:
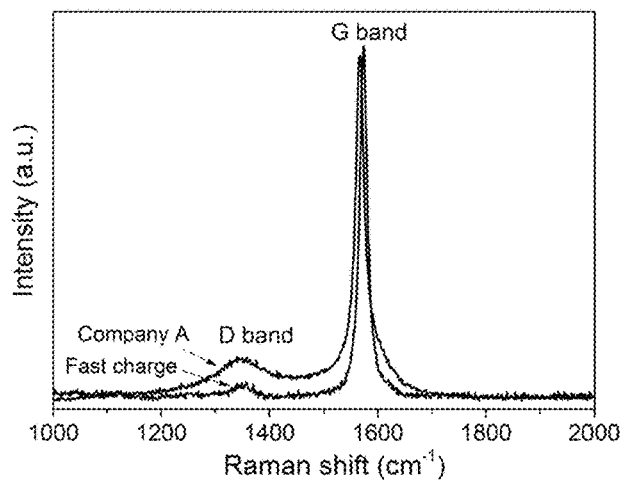
FIG. 1C depicts Raman spectra of the fast charge graphite according to an embodiment of the present invention and a conventional graphite.

From the Raman spectra as shown in FIG. 1C, two obvious peaks at 1574 and 1342 $cm^{-1}$ are found, which correspond to the graphitic mode (G band) and disordered mode (D band) of the fast charge graphite. The D band to the G band ratio of the fast charge graphite of the present invention is 0.054, less than the ratio of the graphite produced by company A (0.138). The smaller the ratio of the D band to G band is, the higher is the conductivity of the $Li^+$ and electrons.

Figure 1D:
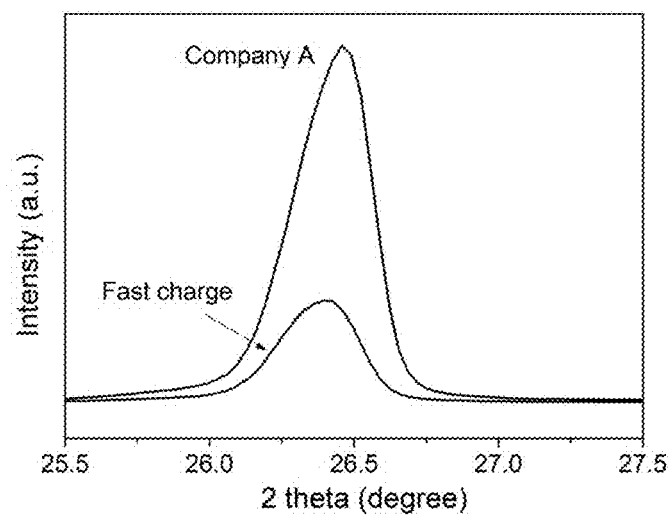
FIG. 1D depicts X-ray diffraction (XRD) patterns of the fast charge graphite according to an embodiment of the present invention and that of a conventional graphite.
Figure 1E:
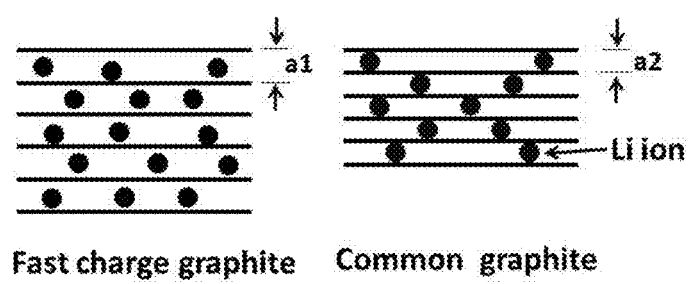
FIG. 1E depicts schematically the effect of graphite lattice constant on lithium ion diffusion in a short period of time according to an embodiment of the present invention.

From the XRD pattern, shown in FIG. 1D, of the graphite produced by a different company, company A, it is found that a diffraction peak of the fast charge graphite of the present invention is centered at 26.35° two theta, while the corresponding diffraction peak of the graphite produced by company A is centered at 26.47° two theta. According to the Bragg law, the lattice constant of the fast charge graphite of the present invention is 0.3374 nm, while the lattice constant of the graphite produced by company A is 0.3367 nm. A corresponding schematic illustration is shown in FIG. 1E, where a1>a2. A larger lattice constant can provide more space for Li ions, facilitating the diffusion of Li ions during charge/discharge processes due to less resistance for the ion diffusion. Therefore, the fast charge graphite of the present invention has larger capacity for Li ions in a very short time. In other words, the fast charge graphite of the present invention has better C rate performance than that produced by company A.

Below is an example of preparing a slurry formulation containing the fast charge graphite of the present invention for forming an anode and how it is fabricated into a fast charge lithium ion battery:

In the slurry formulation, the weight ratios of graphite, super P, carboxymethyl cellulose (CMC) and styrene-butadiene rubber (SBR) in the solid materials are in ranges of 70%~93%, 3%~10%, 3%~10% and 1%~10%, respectively. The minimum weight ratio of CMC should be no less than 3% to avoid the sediment of the solid materials after some time. For a specific storage period, there is no sediment after one week. The viscosity of the slurry is tuned into a range of 3,800-8,000 cps.

The slurry is prepared in a double planetary mixer. At first, some amount of deionized (DI) water is added into the tank. CMC powders are added. The rate of the stirring mixer is in a range of 10~80 rpm, while the rate of the dispersing mixer is in a range of 1,000~5,000 rpm. The mixing time is in a range of 1~3 h. For a specific mixing of CMC, the rates of stirring and dispersing mixer are 60 rpm and 2000 rpm and keep mixing for 1 h. Next, the super P powder is added. The rate of the stirring mixer is in the range of 10~80 rpm, while the rate of the dispersing mixer is in the range of 1,000~5,000 rpm. The mixing time is in the range of 1~3 h. For a specific mixing of super P, the respective rates of stirring and dispersing mixer are 60 rpm and 2,000 rpm and keep mixing for 1 h. Then, the graphite powder is added. The rate of the stirring mixer is in the range of 10~80 rpm, while the rate of the dispersing mixer is set to be in a range of 1,000~5,000 rpm. The mixing time is in a range of 1~3 h. For a specific mixing of graphite, the respective rates of stirring and dispersing mixer are 60 rpm and 2,000 rpm and keep mixing for 2 h. Following, the SBR solution is added. The rate of the stirring mixer is in a range of 10~80 rpm, while the rate of the dispersing mixer is in the range of 10005000 rpm. The mixing time is in a range of 1~3 h. For a specific mixing of SBR, the respective rates of stirring and dispersing mixer are 60 rpm and 1000 rpm and keep mixing for 1.5 h. Additional DI water is added to tune the viscosity of the slurry into the range of 3,800~8,000 cps.

The slurry is coated by slot die and the two sides are coated with the slurry at the same time. After drying the coatings, they are compressed e.g. calendered, at room temperature. For specific application, the anodes are calendered. Herein, the compression ratio (CR) is defined as the ratio of the thickness of the coating after compression divided by the pristine dry thickness which can be done by calendering between a pair of rollers or similar process. The CR should be in a range of 0.6~0.8. For better long cycling performance under high C rate, the CR should be in the range of 0.65~0.7. The areal capacity of the anode can be in a range of 0~3.5 $mAh/cm^2$. For fast charge application with longer cycling performance, the areal capacity is in a range of 1.5~2.8 $mAh/cm^2$. The areal density (or mass loading) is in a range of 5-10 $mg/cm^2$.

The cathode materials can be $LiFePO_4$, $LiMnO_3$, $LiCoO_2$, $LiNi_xMn_yO_2$ and $LiNi_{0.1x}Co_{0.1y}Mn_{0.1z}O_2$ (NCMxyz, x=1~10, y=1~10, z=1~10). For a specific design, NCM523 is applied as cathode material. Taking the wound battery, rectangular model 461045, as an example, the thickness*width*length is 4.6 mm*10 mm*45 mm. The width*length of the anode is 37 mm*130 mm. The width*length of cathode is 36 mm*110 mm. The separator is composed of PP and PE layers with or without ceramic materials on the surface. The thickness can be in a range of 5~40 μm. For specific application, the thickness*width*length of the separator is 10 um*40 mm*155 mm. After winding the electrodes, the electrode rolls will be pressed at 40° C. for 15 s by press machine. After pre-sealing, the battery is dried at 90° C. for 48 h. 1 g of electrolyte is added and the battery is wetted for 2 days.

After sealing the batteries, they are pressed at room temperature by press machine. In the formation procedure, the batteries are charged to 3.9 V at 0.1C and then charged to 4.35 V at 0.5C. Then the batteries will be aged at 45° C. for 12 h. Following, a second sealing is carried out to remove the gas generated during formation.

Figure 2:
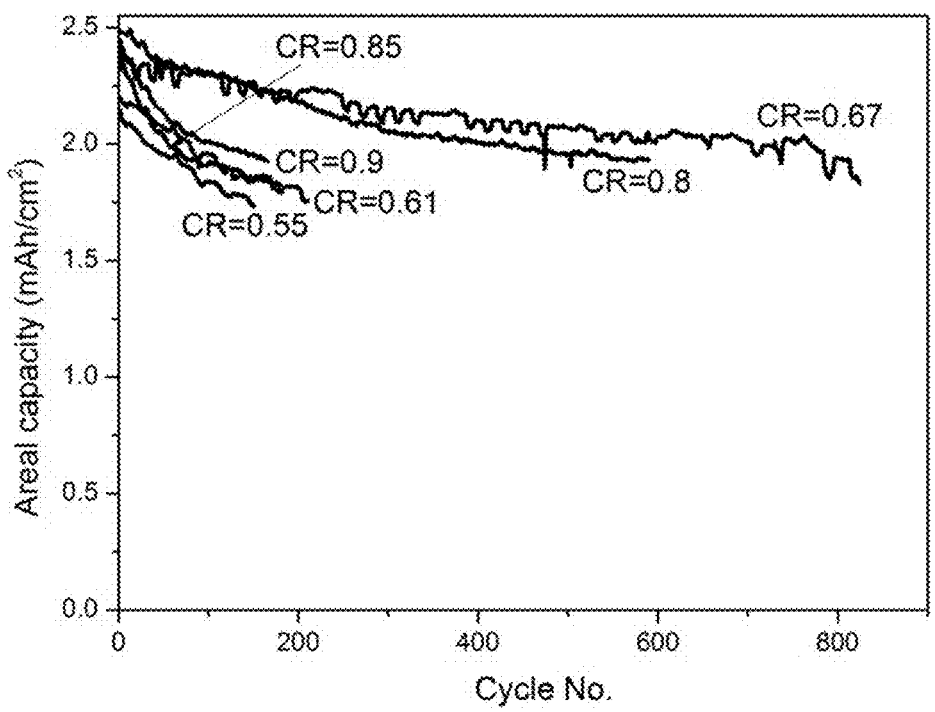
FIG. 2 depicts the cycling performance of the fast charge lithium ion batteries with different anode compression ratios (or called calender ratios) charged/discharged at 2C according to certain embodiments of the present invention.

FIG. 2 shows the cycling performance of the batteries with different anode CRs charged/discharged under 2C. As the CR decreases from 0.9 to 0.67, 80% retention of the capacity of the batteries is obviously enhanced from 166 cycles to 824 cycles. However, when the CR further decreases to 0.55, 80% retention of the capacity of the batteries under 2C decreases to 150 cycles. Calendering is a necessary procedure in the industry for the production of Li ion battery. This is because after drying the electrode, lots of pores appear in the electrode coating due to the evaporation of the solvent. In such case, the conducting agent cannot well contact with the active materials, leading to a large resistance of the battery. Proper calendering treatment of the electrode can enhance the contact of the conductive agent with graphite, decreasing the inner resistance of battery as a result of the improved cycling performance at high C rate. However, when the electrode is over-calendered, there is less space for Li ion diffusion, worsening the fast charge performance of the battery. According to the above result, an optimal CR is in a range of 0.65~0.7.

Figure 3:
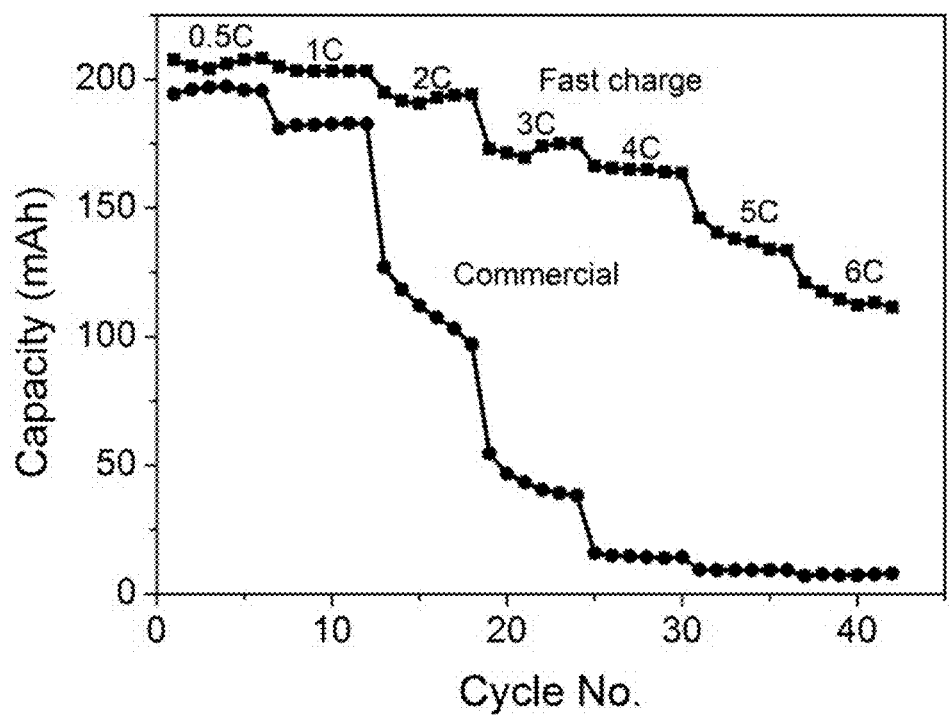
FIG. 3 depicts the C rate performance of the wound lithium ion batteries according to an embodiment of the present invention compared with the commercial battery.

FIG. 3 shows the C rate performance of the batteries with NCM523/graphite battery. The capacity retention at 1C, 2C, 3C, 4C, 5C and 6C compared with 0.5C are 97.6%, 93.2%, 84.1%, 78.8%, 63.5% and 54.5%, respectively. In contrast, for a commercial battery, the capacity retention at 1C, 2C, 3C, 4C, 5C and 6C compared with 0.5C are 92.9%, 65.3%, 27.6%, 8.2%, 4.6% and 3.6%, respectively. It demonstrates that the fast charge battery of the present invention shows much better C rate performance compared with the commercial battery.

Figure 4:
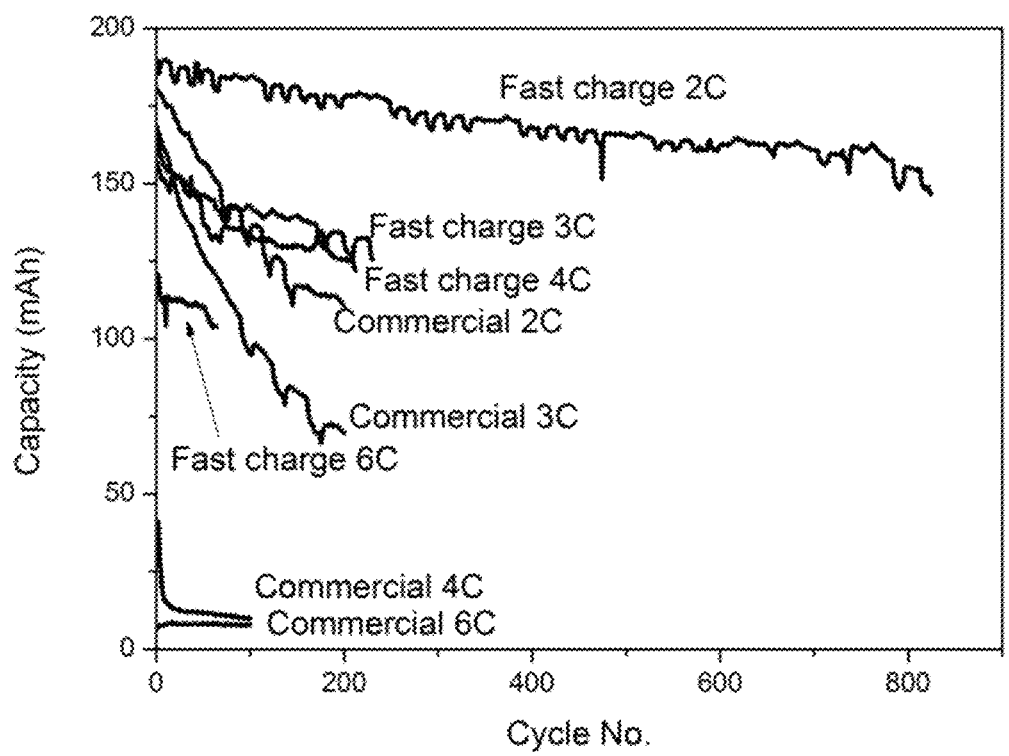
FIG. 4 depicts long cycling performance of the fast charge Li ion batteries and commercial Li ion batteries under 2C, 3C, 4C and 6C.

FIG. 4 shows the cycling performance of the fast charge batteries and the commercial batteries at 2C, 3C, 4C and 6C. The fast charge battery charged/discharged at 2C, 3C, 4C and 6C can run 834, 230, 212, and 64 cycles, respectively, with 80% capacity retention, while the commercial battery can only run 70, 40, 3, 1 cycle(s), respectively, under the same C rates with 80% capacity retention.

Figure 5:
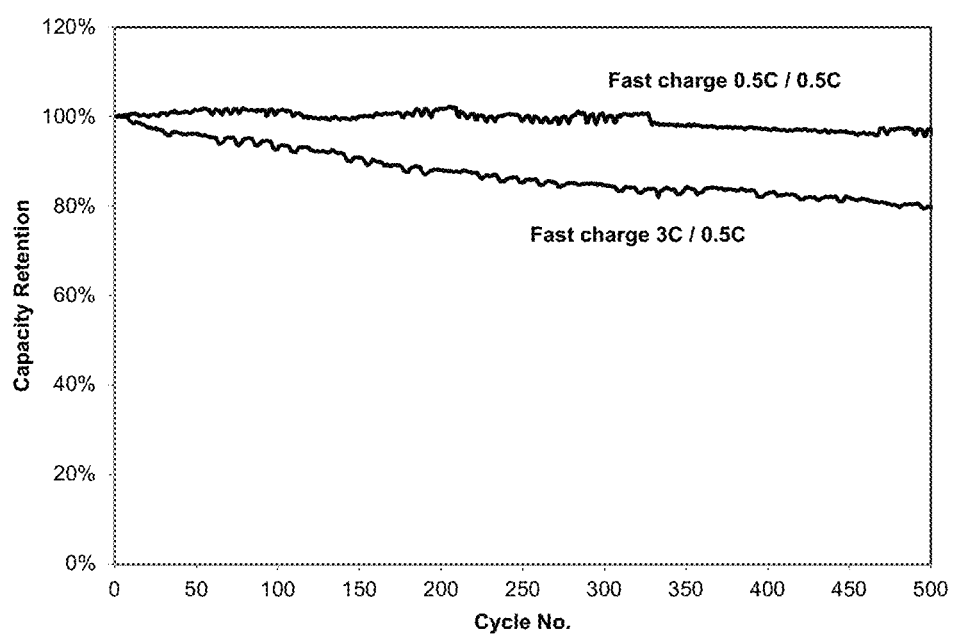
FIG. 5 depicts the capacity retention of the fast charge battery charging at 0.5C and 3C, and discharging at 0.5C.

FIG. 5 shows that the fast charge battery charged at 0.5C and 3C (discharged at 0.5C) can retain 96% and 80% of initial capacity after 500 cycles, respectively. This indicates that the fast charge battery in the present invention has good capacity retention at both high (3C) and low (0.5C) C-rate cycling.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A fast charge lithium ion battery capable of being charged or discharged with 80% capacity retention at C rate of at least 2C, comprising
a fast charge graphite-based anode;
a cathode; and
a separator,
wherein the anode includes an anode current collector and a fast charge graphite layer deposited on at least one surface of the anode current collector, the fast charge graphite having a lattice constant equal to or larger than 0.3374 nm; the fast charge graphite also having a D-band to G-band integrated area ratio ($I_D/I_G$) in a range of 0.03-0.3, with a peak intensity of the G-band integrated area in a range of 1300~1400 cm$^{-1}$ and a peak intensity of the D-band integrated area in a range of 1530~1650 cm$^{-1}$ as measured by Raman spectroscopy at a laser wavelength of 633 nm; the fast charge graphite also having a surface morphology of a plate-like crystal structure under a scanning electron microscope;
the cathode includes a cathode current collector and one or more active materials deposited on at least one surface of the cathode current collector.

2. The battery of claim 1, wherein the fast charge graphite has an X-ray diffraction peak at 26.35° two theta.

3. The battery of claim 1, wherein the fast charge graphite has particle sizes of 5~30 μm with more than 60% thereof are less than 20 μm.

4. The battery of claim 1, wherein the one or more active materials deposited on the cathode current collector comprise $LiFePO_4$, $LiMnO_2$, $LiCoO_2$, $LiNi_xMn_yO_2$ and $LiNi_{0.1x}Co_{0.1y}Mn_{0.1z}O_2$, where x=1~10; y=1~10; z=1~10.

5. The battery of claim 1, wherein the separator comprises PP and PE layers with or without ceramic materials on at least one surface thereof.

6. The battery of claim 5, wherein the separator has a thickness of 5~40 μm.

7. The battery of claim 1, wherein the fast charge graphite layer is formed by a graphite slurry formulation comprising the fast charge graphite, super P, carboxymethyl cellulose (CMC) and styrene-butadiene rubber (SBR).

8. The battery of claim 7, wherein the fast charge graphite, super P, CMC and SBR have weight ratios of 70%~93%, 3%~10%, 3%~10% and 1%~10%, respectively.

9. The battery of claim 7, wherein the fast charge graphite layer is formed by coating the graphite slurry formulation on at least one surface of the anode current collector via compression at a compression ratio of 0.6~0.8.

10. The battery of claim 9, wherein said compression is calendering and is carried out at room temperature.

11. The battery of claim 9, wherein the anode has an areal capacity of 0~3.5 mAh/cm$^2$.

12. The battery of claim 9, wherein the anode has a mass loading of 5~10 mg/cm$^2$.

13. The battery of claim 1, wherein the battery is capable of being charged or discharged with 80% capacity retention at C rate of 2C, 3C, 4C and 6C for 834, 230, 212, and 64 cycles, respectively.

* * * * *